May 4, 1954      W. A. RAY      2,677,711
RADIATION THERMOCOUPLE
Filed Sept. 22, 1951
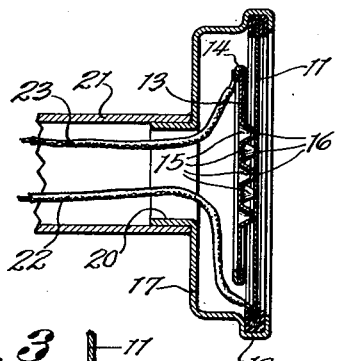
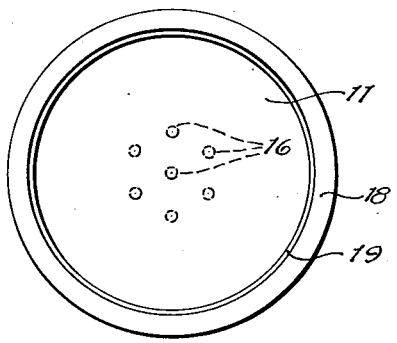
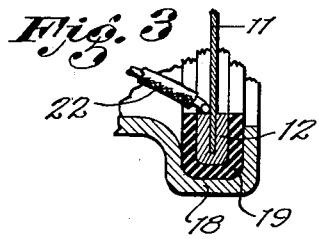
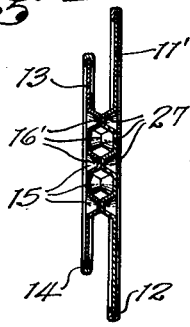
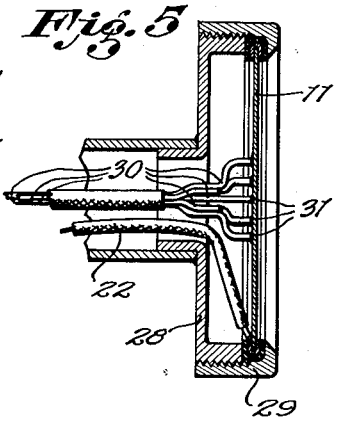
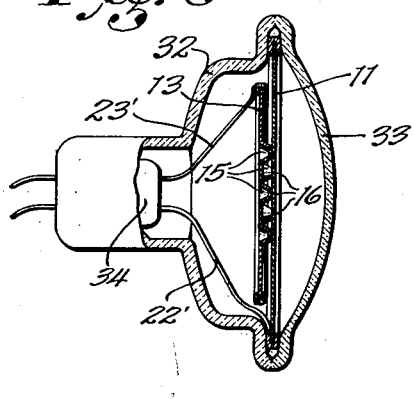
Inventor,
WILLIAM A. RAY
By John H. Rouse,
Attorney Patented May 4, 1954

2,677,711

UNITED STATES PATENT OFFICE 2,677,711

RADIATION THERMOCOUPLE

William A. Ray, North Hollywood, Calif., assignor to General Controls Co., Glendale, Calif., a corporation of California Application September 22, 1951, Serial No. 247,811

8 Claims. (Cl. 136—4)

This invention relates to thermoelectric generating devices of the type adapted to be influenced by thermal radiation; a general object of the invention being to provide a thermocouple whose response to variation of the intensity of the radiation is rapid and whose electrical resistance, notwithstanding, is relatively low.

The radiation thermocouple of this invention, while obviously capable of other uses, has particular utility for sensing the combustion of an oil-burner; the electricity generated by the thermocouple being then employed, for example, to "saturate" a reactor in a magnetic amplifier for controlling the operation of the burner, or for direct energization of a sensitive relay.

The E. M. F. of a thermocouple under these circumstances is small, and it is therefore essential that the electrical resistance of the thermocouple be low to avoid excessive loss of power. But it is also essential, to avoid sluggish response of the thermocouple, that its mass and thermal capacity be small.

For full understanding of how, by this invention, the foregoing requirements are met, reference is to be had to the following detailed description and accompanying drawing, wherein:

Figure 1 is a sectional view of a thermocouple structure embodying this invention;

Figure 2 is a front elevation of the structure shown in Fig. 1;

Figure 3 is an enlarged view of a portion of the rim of the structure shown in Fig. 1;

Figure 4 is a sectional view of a slightly modified form of the thermocouple shown in Fig. 1;

Figure 5 is a sectional view of a modified thermocouple structure according to the invention; and Figure 6 is a sectional view showing the thermocouple of Fig. 1 sealingly mounted in a radiation-transmitting envelope.

Referring first more particularly to Figs. 1–3, the numeral 11 indicates a sheet or disk of thin metal around whose margin is folded a ring 12 of soft highly-conductive metal such as copper. At the back of disk 11, in parallel and generally-spaced relation thereto, is another disk 13 having around its margin a ring 14 similar to the ring 12. The inner sheet or back disk 13 is indented to provide a plurality of hollow frusto-conical projections 15 which are secured at their tips, as by spot-welding, to the outer disk 11 to form therewith thermoelectric junctions 16; the disks 11 and 13 being of metals or alloys thermoelectrically dissimilar to each other.

The thermocouple formed by disks 11 and 13 is mounted in a cupped housing 17 having a rim portion 18 which provides a recess for the ringed margin of disk 11 and around which the material of the housing is crimped, with insulating material 19 therebetween. At its inner end the housing 17 has a short tubular extension 20 to which a tube 21 is attached; this tube serving for mounting the structure so that the disk 11 faces the source of thermal radiation (such as the luminous flame of an oil-burner) to which the thermocouple is to respond. For connecting the thermocouple in a suitable electric circuit, as at the input of a magnetic amplifier, leads 22 and 23 are secured respectively to the rings 12 and 14 of the thermocouple disks or elements 11 and 13.

One of the disks 11 and 13 may, conveniently, be of an alloy containing approximately 90% Ni and 10% Cr (such as "Chromel") and the other of an alloy containing approximately 55% Cu and 45% Ni (such as "Copel"); these alloys having high thermoelectric power in combination. The thickness of disks 11 and 13 should be very small, preferably of the order of 0.002 inch.

The outer disk 11 absorbs thermal radiation from the source toward which it is faced and converts the radiation into heat which influences the "hot" junctions 16 of the thermocouple so that electricity is generated; the "cold-junction" of the thermocouple being effectively at the points at which the leads 22 and 23 are connected to the disks. To minimize generation of counter E. M. F. at the junction of disk 11 and lead 22, the metals of which these parts are made should have the same, or substantially the same, thermoelectric properties; if the disk 11 is of "Chromel" it is generally sufficient if the lead 22 is of copper.

While there is a plurality of separate hot-junctions 16, a corresponding number of cold-junctions are formed at the base of the projections 15, so that there is a plurality of thermocouples electrically in parallel with each other, or, in effect, but a single thermocouple to which all of the hot-junctions 16 are common. By this arrangement there are relatively low-resistance paths for the generated current, which is an important factor especially when the materials of the thermocouple are such as "Chromel" and "Copel" which, while having high thermoelectric power, also have relatively high resistivity.

The outer disk 11 serves not only to collect the thermal radiation but also to screen the inner disk 13 from that radiation so that the body of disk 13, which determines the cold-junction temperature of the thermocouple, remains relatively cool. The hot-junction areas 16 are made small so that the temperature, as well as the effective thermal capacity, of the outer disk is not substantially affected by conduction of heat to the inner disk through the hot-junctions and the hollow projections 15. However, the hot-junction areas should be of appreciable size, rather than mere points, to avoid excessive resistance at the hot-junctions to the flow of generated current, whose E. M. F. is of the order of but a few millivolts. The copper rings 12 and 14 facilitate flow of current through the whole area of the disks and contribute to the effectiveness of the arrangement.

By making the outer disk 11 of the extreme thinness mentioned above (of the order of 0.002″) its mass and thermal capacity are correspondingly small, and the response of the thermocouple to establishment and cessation of thermal radiation rapid; responsive operation of typical controlling apparatus occurring in about 5 to 15 seconds. To avoid unduly increasing the effective thermal capacity of the outer disk by thermal transfer between the disks, the inner disk 13 is preferably also made of thin material.

In the thermocouple shown in Fig. 4 the back disk 13 is identical with that shown in Fig. 1; the front disk 11′, instead of being plane, is indented to provide conical projections 27 registering with the projections 15 of disk 13 and spot-welded thereto to form hot-junctions 16′. This thermocouple is adapted to be mounted as in the arrangement of Figs. 1–3 and operates in substantially the same manner as the thermocouple described in connection with those figures.

The thermocouple structure shown in Fig. 5 includes a front disk 11 which is the same as the disk indicated by that numeral in Figs. 1–3; the disk being shown mounted generally in the same manner as in those figures except that in Fig. 5 the thermocouple housing comprises a cupped portion 28 and a threaded sleeve 29 which cooperate to clamp the ringed margin of the disk. In place of the inner disk of Figs. 1–3, in the arrangement of Fig. 5 there is a plurality of wires 30 which are butt-welded to the disk 11 to form therewith hot-junctions 31 of small area and arranged generally in the same manner as the junctions 16 in Fig. 2; the wires 30, which are of metal thermoelectrically dissimilar to that of disk 11, being extended to form, in common, one lead of the thermocouple. In the thermocouple of Fig. 5 the disk 11 serves (as it does in the other arrangements illustrated) to collect and absorb the thermal radiation and to convert it into heat for influencing the hot-junctions 31; the disk 11 also serving to screen from the radiation the wires 30 whose remote ends form, effectively, the cold-junction of this thermocouple.

In Fig. 6 a thermocouple, identical with that of Figs. 1–3, is shown mounted in a hermetically-sealed vitreous envelope which comprises a cupped base 32 and a cover 33 fused to the base with the ringed margin of the disk 11 clamped therebetween; the cover 33 being of material having good transmittancy of thermal radiation, such as quartz glass. The base 32 has a pinched portion 34 through which the leads 22′ and 23′ sealingly extend. The delicate thermocouple disks being fully enclosed and protected, this structure may be placed close to the source of thermal radiation, as in an oil-burner furnace, without fear of damage. The envelope is preferably evacuated to avoid conduction of heat from the slowly-cooling cover 33 to the disk 11 after the oil-burner flame is extinguished.

The specific embodiments of my invention herein shown and described are obviously susceptible to modification without departing from the spirit of the invention, and I intend therefore to be limited only by the scope of the appended claims.

I claim as my invention:

1. A thermoelectric generating device comprising a thin sheet adapted to be faced toward a source of thermal radiation; and means at the back of said sheet, of material thermoelectrically dissimilar to that of the sheet, in engagement with the sheet only at a plurality of small spaced-apart areas and forming at those areas the thermoelectric hot-junctions of the device.

2. A thermoelectric generating device comprising a thin metallic sheet adapted to be faced toward a source of thermal radiation to absorb the same and thereby convert it into heat; and means at the back of said sheet, of metal thermoelectrically dissimilar to that of the sheet, in engagement with the sheet only at a plurality of small spaced-apart areas and forming at those areas the thermoelectric hot-junctions of the device, the mass and arrangement of said last-named means being such that the effective thermal capacity of said sheet is not substantially increased.

3. A thermoelectric generating device comprising a thin metallic sheet adapted to be faced toward a source of thermal radiation; and means, at the back of said sheet and screened thereby from said radiation, of metal thermoelectrically dissimilar to that of the sheet and in engagement with the sheet only at a plurality of small spaced-apart areas and forming at those areas the thermoelectric hot-junctions of the device, the mass and arrangement of said last-named means being such that the effective thermal capacity of said sheet is not substantially increased.

4. A thermoelectric generating device comprising a first sheet of thin metal adapted to be faced toward a source of thermal radiation; a second sheet of thin metal at the back of said first sheet and screened thereby from said radiation; and means, of metal thermoelectrically dissimilar to that of said first sheet, electrically interconnecting said sheets and forming with the first sheet a plurality of thermoelectric hot-junctions at points on the first sheet spaced from each other and small in area.

5. A thermoelectric generating device comprising a pair of thin sheets of thermoelectrically dissimilar metals; one of said sheets being adapted to be faced toward a source of thermal radiation; the other of said sheets being at the back of said one of the sheets and in generally-parallel spaced relation thereto; said other of the sheets being somewhat smaller than said one of the sheets and so that it is screened thereby from said radiation; at least one of said sheets being deformed to provide a plurality of projections engaging the other of the sheets and forming therewith thermoelectric hot-junctions at points spaced from each other 6. A thermoelectric generating device comprising a pair of thin sheets of thermoelectrically dissimilar metals; one of said sheets being adapted to be faced toward a source of thermal radiation; the other of said sheets being at the back of said one of the sheets and in generally-parallel spaced relation thereto; said other of the sheets being somewhat smaller than said one of the sheets and so that it is screened thereby from said radiation; at least one of said sheets having a plurality of indentions forming hollow projections engaging the other of the sheets and secured to form therewith thermoelectric hot-junctions at points spaced from each other.

7. A generating device as defined in claim 6, and wherein said indentions are frusto-conical.

8. A thermoelectric generating device comprising a sheet of thin metal adapted to be faced toward a source of thermal radiation; and a plurality of wires, of metal thermoelectrically dis- similar to that of said sheet, secured to the back of the sheet to form therewith thermoelectric hot-junctions at points spaced from each other and small in area.

References Cited in the file of this patent

UNITED STATES PATENTS

| Number | Name | Date |
|---|---|---|
| 2,543,369 | Kling | Feb. 27, 1951 |